United States Patent [19]
Martin et al.

[11] Patent Number: 5,893,596
[45] Date of Patent: Apr. 13, 1999

[54] KITCHEN UTENSIL

[75] Inventors: Andy R. Martin; Bob Weber, both of Los Angeles, Calif.

[73] Assignee: Robert Kaplan, Santa Monica, Calif.

[21] Appl. No.: 08/789,880

[22] Filed: Jan. 28, 1997

[51] Int. Cl.$^6$ .................................................. B25B 7/02
[52] U.S. Cl. ............................ 294/118; 294/16; 100/234
[58] Field of Search ........................... 294/3, 7, 8, 8.5, 294/11, 16, 902, 118; 100/213, 234; 99/380–382, 538, 565

[56] References Cited

U.S. PATENT DOCUMENTS

| | | |
|---|---|---|
| 66,492 | 7/1867 | Hellen ................................ 294/118 |
| 1,875,277 | 8/1932 | Sweeney ............................. 99/381 |
| 2,184,454 | 12/1939 | Hill ................................... 100/213 |
| 2,566,577 | 9/1951 | McDevitt . |
| 2,634,159 | 4/1953 | Agneberg ........................... 294/118 |
| 2,747,912 | 5/1956 | Franklin ............................ 294/118 |
| 2,887,948 | 5/1959 | Kramer et al. . |
| 2,961,683 | 11/1960 | Meyer ............................... 294/118 |
| 3,352,132 | 11/1967 | Jones et al. ......................... 294/118 |
| 3,469,525 | 9/1969 | Coons . |
| 3,596,965 | 8/1971 | Woofter ............................. 294/7 |
| 3,628,818 | 12/1971 | Pittman ............................ 294/118 |
| 3,655,233 | 4/1972 | Twist .............................. 294/118 |
| 3,957,298 | 5/1976 | Purchase . |
| 4,073,533 | 2/1978 | De brey et al. . |
| 4,383,367 | 5/1983 | Mielnicki .......................... 99/538 |
| 4,577,900 | 3/1986 | Chasen . |
| 4,606,569 | 8/1986 | Dunn et al. . |

*Primary Examiner*—Dean Kramer
*Attorney, Agent, or Firm*—Blakely, Sokoloff, Taylor & Zafman LLP

[57] ABSTRACT

The present invention is a food utensil that is used to handle and open baked potatoes. The utensil has a pair of canted cups that extend from a pair of arms. Opposite from the cups are a pair of handles that can be manipulated by the user. The arms are pivotally connected by a pin that allows corresponding movement of the handles and cups. A baked potato can be grasped by the cups, and then the potato opened by initially creating a slit along the exposed side of the potato while being retained in the cups. The handles are then squeezed to move the cups closer together and create a compressive force on the potato, concentrated at each end of the potato adjacent the ends of the slit by inward projecting protrusions in the cups pressing on the potato. The compressive force widens the slit and opens the potato, partially crushing the interior of the potato in the manner normally achieved manually. The opened potato can then be placed on a plate and removed from the cups.

7 Claims, 4 Drawing Sheets

KITCHEN UTENSIL

BACKGROUND OF THE INVENTION

1. Field of the Invention

The present invention relates to a food utensil for handling and opening a baked potato.

2. Description of Related Art

Baked potatoes are typically prepared by exposing the inner portion of the potato so that condiments such as butter and sour cream can be placed on the exposed inner potato. The inner portion is typically exposed by initially creating a slit along a side of the potato, and then pushing on the potato ends to widen the slit and crush a portion of the interior of the potato.

Baked potatoes are normally very hot when removed from an oven, thereby requiring the person cooking to use a cloth or to puncture the potato with a fork to remove the same from the oven and to slit and partially crush the potato to open the slit. Without a suitable utensil for this purpose, this normally is an awkward operation, all too frequently resulting in minor burns from the potato itself or the oven.

Opened baked potatoes are also frequently served by restaurants, particularly as a side dish to an entree item. Consequently, restaurant personnel must continually perform the task of slicing and opening a relatively large number of baked potatoes. Handling a hot potato can be uncomfortable, even for a professional. Additionally, the size of the opening may vary between potatoes, thereby creating an inconsistency in the presentation of the dishes.

It would therefore be desirable to have a utensil that can assist in the handling and opening of a potato from oven to serving dish.

SUMMARY OF THE INVENTION

The present invention is a food utensil that is used to handle and open baked potatoes. The utensil has a pair of canted cups that extend from a pair of arms. Opposite from the cups are a pair of handles that can be manipulated by the user. The arms are pivotally connected by a pin that allows corresponding movement of the handles and cups. A baked potato can be grasped by the cups, and then the potato opened by initially creating a slit along the exposed side of the potato while being retained in the cups. The handles are then squeezed to move the cups closer together and create a compressive force on the potato, concentrated at each end of the potato adjacent the ends of the slit by inward projecting protrusions in the cups pressing on the potato. The compressive force widens the slit and opens the potato, partially crushing the interior of the potato in the manner normally achieved manually. The opened potato can then be placed on a plate and removed from the cups.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
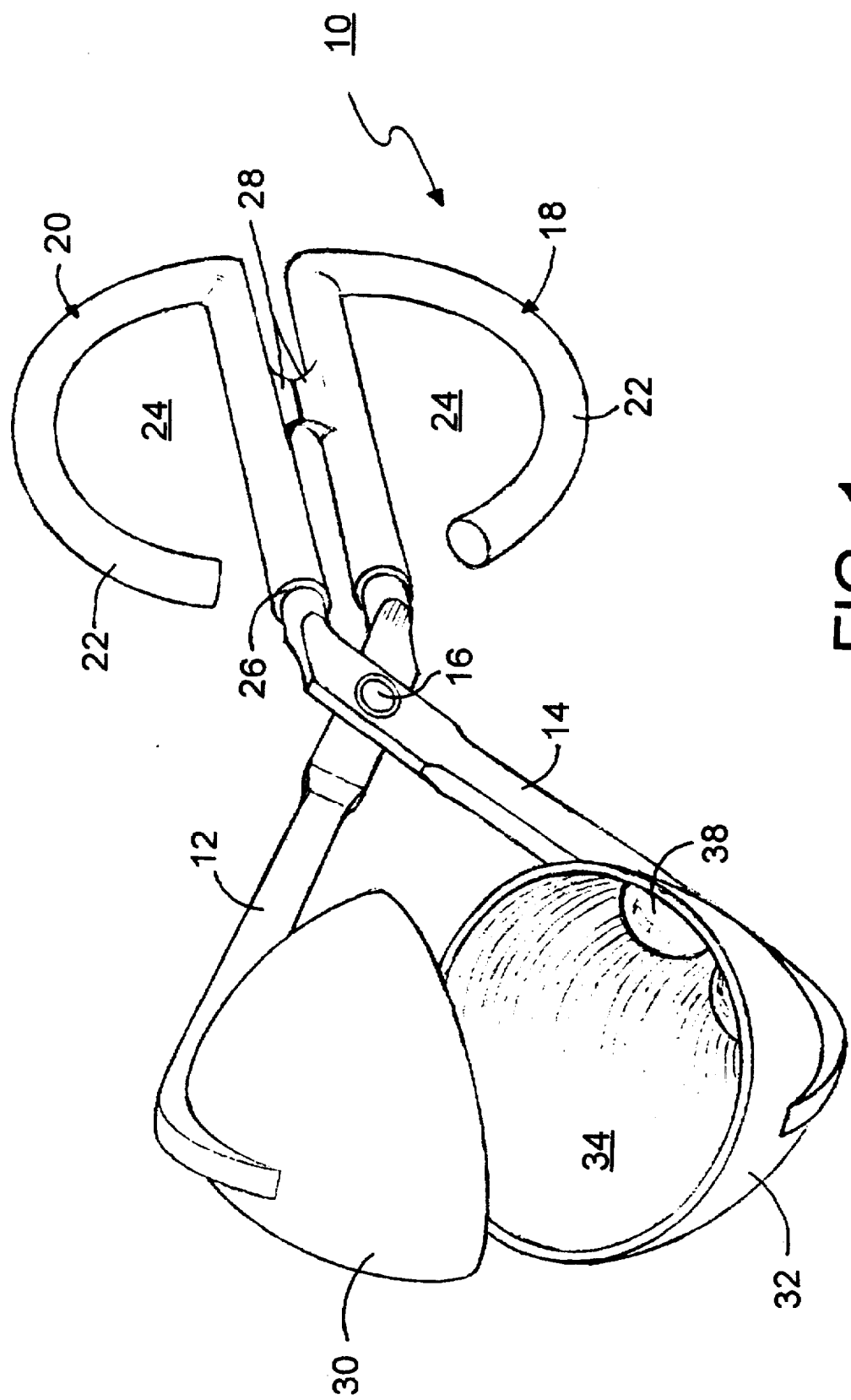
FIG. 1 is a perspective view of a food utensil of the present invention.

Referring to the drawings more particularly by reference numbers, FIG. 1 shows a food utensil 10 of the present invention. The utensil 10 is typically used to handle and to open a hot baked potato, providing easy and convenient transport of the potato from the oven, through slitting and opening, to the serving dish and placement of butter, etc. therein. Although using the food utensil 10 to open a hot potato is shown and described, it is to be understood that the utensil 10 may have other functions.

The utensil 10 has a first arm 12 that is pivotally connected to a second arm 14 by a pin 16. The arms 12 and 14 may be constructed from a relatively strong and rugged material such as steel. Because the utensil 10 is used in a kitchen environment it may be desirable to construct the arms from a stainless steel, though plated steel, cast metal or even appropriate plastics may be used. The arms 12 and 14 are free to rotate about the pin 16 in a scissors type fashion.

Extending from the first arm 12 is a first handle 18. Extending from the second arm 14 is a second handle 20. The handles 18 and 20 may each have an arcuate shaped portion 22 that defines an opening 24. The openings 24 are typically large enough to allow human fingers to extend there through. The utensil 10 is typically manipulated by extending the thumb through one opening 24 and the fore finger or fingers through the other opening 24. In the preferred embodiment, the handles 18 and 20 may each have an outer layer of rubber or plastic coating 26 that increases the friction and grasping area of the utensil 10, and insulates the same from any heat conducted along the arms. Additionally, the utensil 10 may have a pair of stops 28 that limit the motion of the handles 18 and 20.

Attached to the first arm 12 is a first cup 30. Attached to the second arm 14 is a second cup 32. The cups are typically constructed from the same material as the arms, though different materials may be used if desired. Also, the cups may be integral with the arms, or joined thereto by welding, riveting or by other techniques customary in the utensil art. Each cup has an inner cavity 34 that is large enough to receive the end of a typical potato.

Figure 2:
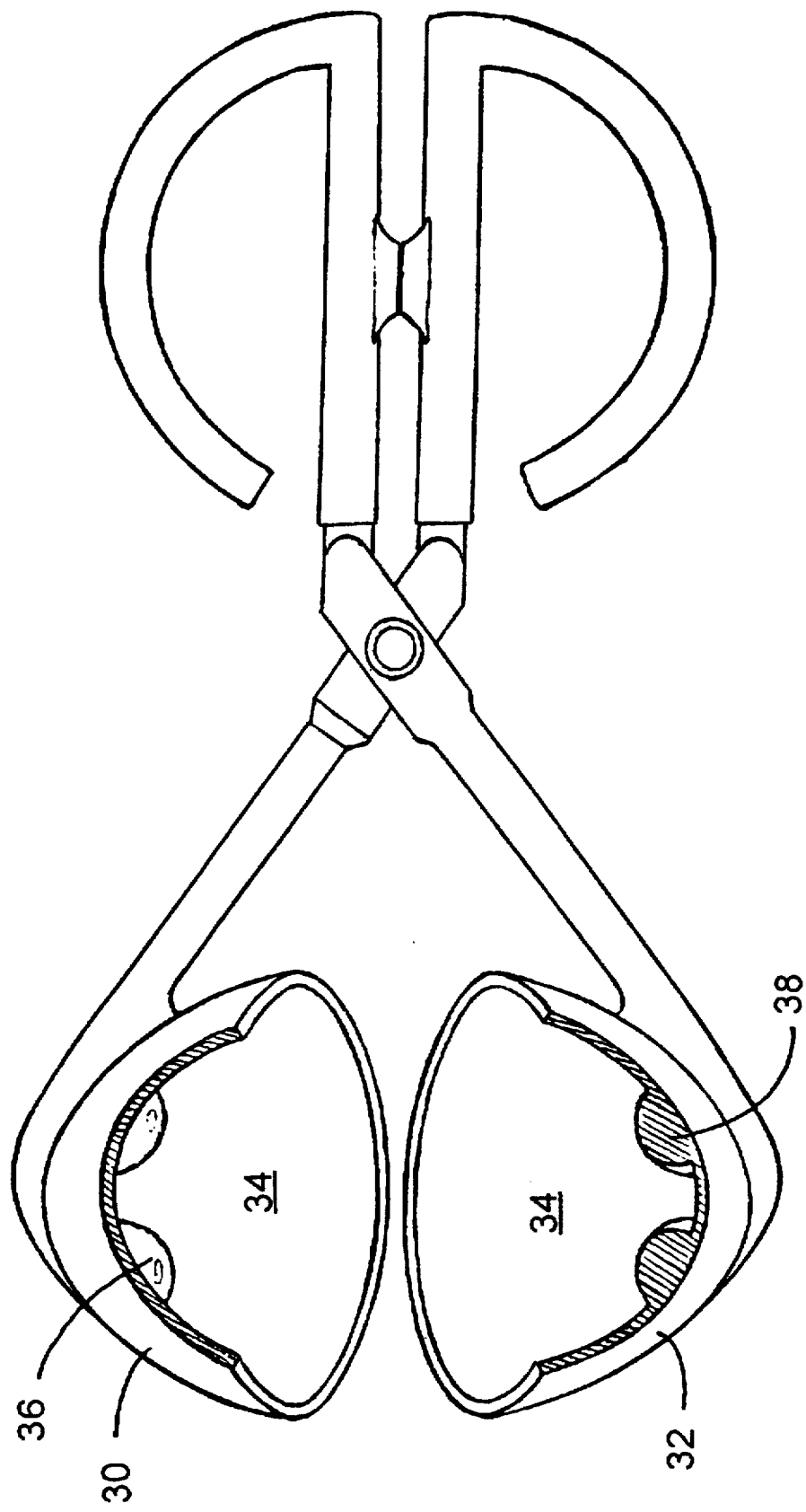
FIG. 2 is a sectional view showing the inward projecting protrusions of the utensil cups.

As may be seen in FIG. 2, the cups 30 and 32 are not disposed on the arms so as to directly face each other. Instead, the cups are canted, in the preferred embodiment approximately 22.5 degrees about a horizontal axis (relative to FIG. 2), so that when the cups approach each other at one point, they open toward the opposite side at an approximately 45 degree included angle. This exposes a large part of one side of a baked potato as grasped by the cups, allowing the convenient slitting thereof in the conventional manner while being positively retained by the utensil.

As shown in FIG. 2, the first cup 30 has a pair of first projecting protrusions 36 located on the sidewall of the inner cavity 34. Likewise, the second cup 32 has a pair of second inward protrusions 38 located on the sidewall of the second cup inner cavity 34. The second protrusions 38 are located opposite from the first protrusions 36, each pair of protrusions being located so as to put local pressure on the ends of the potato adjacent the ends of the slit therein when the handles are squeezed to open a potato.

Figure 3:
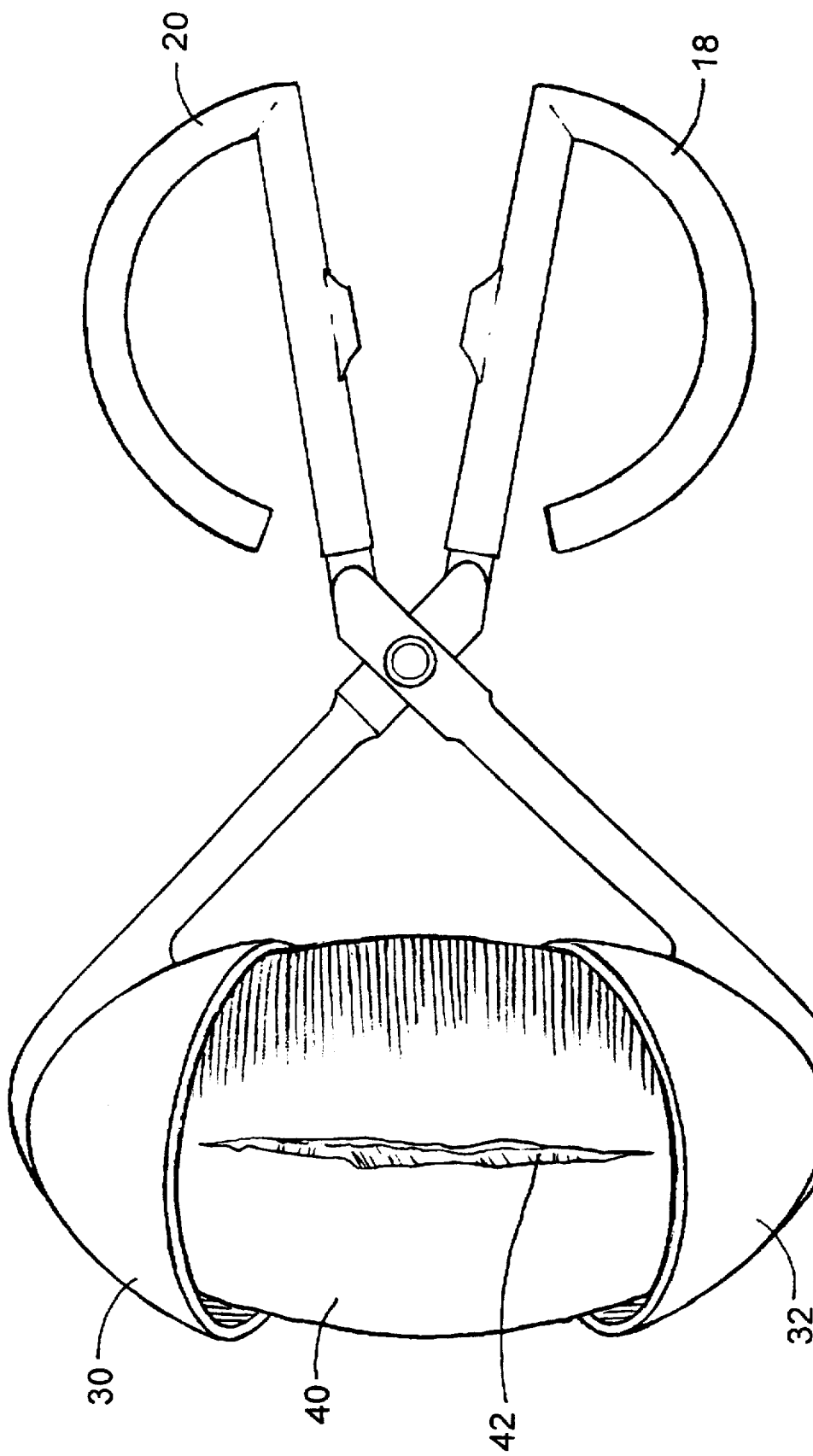
FIG. 3 is a perspective view showing a hot potato within the cups of the utensil.
Figure 4:
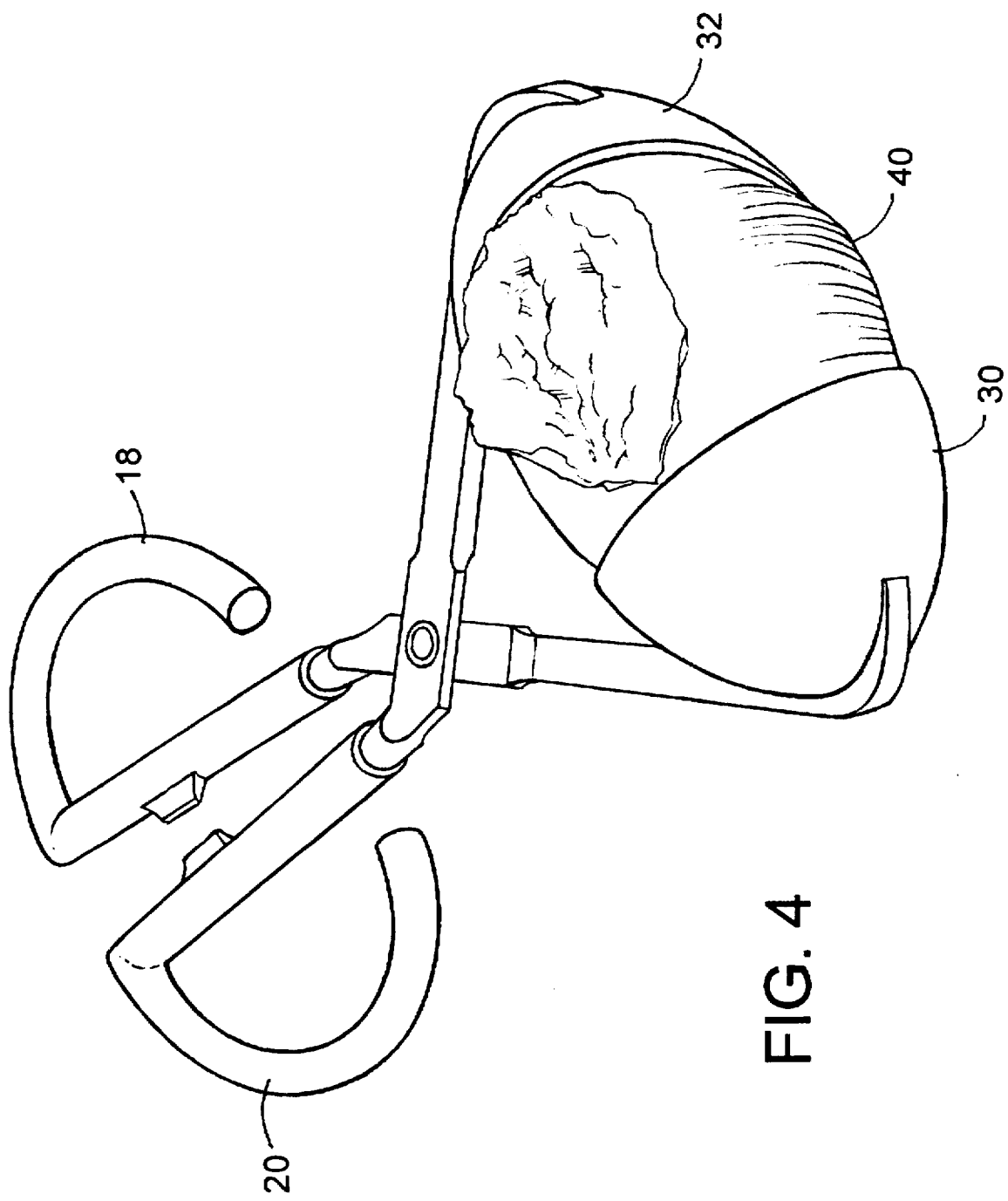
FIG. 4 is a perspective view showing the utensil opening the potato.

As shown in FIGS. 3 and 4, to open a baked potato 40, the handles 18 and 20 are rotated to separate the cups 30 and 32 and the cups are placed adjacent the ends of the potato 40. Since a potato will normally lay flat, the potato is easily grasped by the ends by the utensil while holding the utensil in a horizontal plane. By lightly squeezing the handles 18 and 20 together, the potato will be firmly grasped by the cups and can be removed from the oven and held, preferably on a plate, serving dish or cutting board. Then a slit 42 is initially made along a side of the potato exposed through the region of greatest separation of the cups. The handles 18 and 20 are then rotated together more firmly to move the cups 30 and 32 closer together. The movement of the cups 30 and 32 creates a compressive force on the potato 40, concentrated primarily in the regions of the inward projecting protrusions in the cups. The compressive force widens the slit 42 to further open the potato 40, at the same time partially crushing the interior of the potato in a manner substantially identical to that normally done by hand at the risk of burns or through the use of a hot pad, etc., all without the risk of burns, dropping the potato or inconsistency in the results. Release of the potato may readily be accomplished when the potato is properly located on a serving dish, though the utensil of the present invention is convenient to use to hold the potato while butter is being placed in the potato, particularly if the butter is hard, as the utensil will hold the potato firmly as the butter is scrapped off the knife by the potato itself. Thus the present invention provides a food utensil that will readily and most conveniently handle and open a baked potato.

While a certain exemplary embodiment has been described and shown in the accompanying drawings, it is to be understood that such embodiment is merely illustrative of and not restrictive on the broad invention, and that this invention not be limited to the specific constructions and arrangements shown and described, since various other modifications may occur to those ordinarily skilled in the art.

What is claimed is:

1. A food utensil for a potato, comprising:

a first arm;

a first handle that extends from said first arm;

a second arm pivotally connected to said first arm;

a second handle that extends from said second arm;

a first cup attached to said first arm opposite from said first handle; and, a second cup attached to said second arm opposite from said second handle, said second cup cooperates with said first cup to hold the potato;

said first and second cups having inward projecting protrusions positioned to concentrate pressure on a side of a potato adjacent the ends thereof when firmly grasped between said first and second cups, said inward projecting protrusions having substantially smooth and wide enough surface area to allow partial crushing of the interior of a potato without puncturing the surface area on a potato when said potato is firmly grasped between said first and second cups.

2. The food utensil as recited in claim 1, wherein said first and second cups are configured so as to expose a substantial part of one side of a potato when the ends of a potato are grasped by the first and second cups.

3. The food utensil as recited in claim 2, wherein said first and second cups are canted relative to said first and second arms so as to expose a substantial part of one side of a potato when the ends of a potato are grasped by the first and second cups.

4. The food utensil as recited in claim 3, wherein said first and second cups are canted relative to said first and second arms so as form an included angle relative to each other of approximately 45 degrees.

5. The food utensil as recited in claim 1, wherein said first and second arms are pivotally connected by a pin.

6. The food utensil as recited in claim 1, wherein said first and second handles have a pair of stops to limit the minimum proximity of the first and second cups.

7. A method for opening a potato, comprising the steps of:

a) placing the potato between a pair of cups that are pivotally connected to a pair of handles by a pair of arms, the cups having inward projecting protrusions therein to concentrate pressure on a potato;

b) creating a slit along the side of a potato that said protrusions are adjacent each side of each end of said slit;

c) forcibly moving said handles together to move said cups toward each other and to push open the potato.

* * * * *